United States Patent

Bugosh et al.

[11] Patent Number: 5,975,234
[45] Date of Patent: Nov. 2, 1999

[54] ELECTRIC STEERING SYSTEM WITH PLASTIC MOTOR TUBE

[75] Inventors: Mark J. Bugosh, Sterling Heights; Michael J. Boyer, Lake Orion, both of Mich.

[73] Assignee: TRW Inc., Lyndhurst, Ohio

[21] Appl. No.: 08/984,512

[22] Filed: Dec. 3, 1997

[51] Int. Cl.⁶ .................................................. B62D 5/04
[52] U.S. Cl. ........................................... 180/444; 310/89
[58] Field of Search ................................. 180/443, 444, 180/445, 446; 310/89

[56] References Cited

U.S. PATENT DOCUMENTS

| | | | |
|---|---|---|---|
| 3,002,261 | 10/1961 | Avila et al. . | |
| 3,400,454 | 9/1968 | Balke et al. . | |
| 4,415,054 | 11/1983 | Drutchas | 180/79.1 |
| 4,593,781 | 6/1986 | Galtier | 180/79.1 |
| 4,598,787 | 7/1986 | Drutchas | 180/79.1 |
| 4,660,669 | 4/1987 | Shimizu | 180/79.1 |
| 4,660,671 | 4/1987 | Behr et al. | 180/142 |
| 4,666,014 | 5/1987 | Carlson et al. | 180/432 |
| 4,687,976 | 8/1987 | Shimizu | 318/432 |
| 4,766,970 | 8/1988 | Shimizu | 180/79.1 |
| 4,773,497 | 9/1988 | Carlson et al. | 180/79.1 |
| 4,828,062 | 5/1989 | Shimizu | 180/140 |
| 5,051,693 | 9/1991 | Brauer | 324/207.22 |
| 5,083,626 | 1/1992 | Abe et al. | 180/79.1 |
| 5,237,231 | 8/1993 | Blaettner et al. | 310/89 |
| 5,299,649 | 4/1994 | Sano et al. | 180/79.1 |
| 5,334,897 | 8/1994 | Ineson et al. | 310/89 |
| 5,437,349 | 8/1995 | Kurahashi et al. | 180/79.1 |
| 5,490,319 | 2/1996 | Nakamura et al. . | |
| 5,555,951 | 9/1996 | Sugino et al. . | |
| 5,711,396 | 1/1998 | Joerg et al. | 180/444 |
| 5,852,338 | 12/1998 | Boyd, Jr. et al. | 310/89 |

FOREIGN PATENT DOCUMENTS

| | | |
|---|---|---|
| 0667279 | 8/1995 | European Pat. Off. . |
| 0707043 | 4/1996 | European Pat. Off. . |

*Primary Examiner*—Lanna Mai
*Assistant Examiner*—Andrew J. Fischer
*Attorney, Agent, or Firm*—Tarolli, Sundheim, Covell, Tummino & Szabo L.L.P.

[57] ABSTRACT

A steering assembly (10) for turning steerable wheels of a vehicle in response to rotation of a steering wheel (12) includes a pinion (30). A steering member (14) is movable axially to effect turning movement of the steerable wheels of the vehicle. The steering member (14) has a rack portion (34) for engagement with the pinion (30) and an externally threaded screw portion (38). A ball nut (140) extends around the screw portion (38) of the steering member (14) and has an internal thread (144). A plurality of balls (200) are disposed between the internal thread (144) on the ball nut (140) and an external thread (40) on the steering member (14) for transmitting force between the ball nut and the screw portion (38) of the steering member. An electric motor (50) includes a rotor (132) drivingly connected to the ball nut (140) and a stator (70). The stator (70) when energized effects rotation of the rotor (132) and, thereby, rotation of the ball nut (140). The steering assembly includes a one-piece molded plastic member (60) having a first axial portion (62) disposed adjacent to the pinion (30), a second axial portion (66) encapsulating and supporting the stator core (72) and the stator windings (82), and a third axial portion (110) supporting the ball nut (140) for rotation with the rotor (132).

9 Claims, 4 Drawing Sheets

ELECTRIC STEERING SYSTEM WITH PLASTIC MOTOR TUBE

BACKGROUND OF THE INVENTION

1. Technical Field

The present invention relates to a vehicle power assist steering system. In particular, the present invention relates to an electric power assist steering system which includes an electric assist motor for applying force to a steering member, such as a rack.

2. Description of the Prior Art

A known type of vehicle power assist steering system includes a ball nut for transmitting force between a steering member and an electric assist motor. Upon actuation of the electric motor, the ball nut is driven to rotate relative to the steering member. The rotational force of the ball nut is transmitted to the steering member to drive the steering member axially. Axial movement of the steering member effects turning movement of the steerable wheels of the vehicle.

The housing of the assist motor is made from metal. The metal housing weighs up to about five pounds or more. This becomes a substantial portion of the weight of an electric assist steering system.

SUMMARY OF THE INVENTION

The present invention is a steering assembly for turning steerable wheels of a vehicle in response to rotation of a steering wheel of the vehicle. The steering assembly comprises a pinion. The steering assembly also comprises a steering member which is movable axially to effect turning movement of the steerable wheels of the vehicle. The steering member has a rack portion for engagement with the pinion and an externally threaded screw portion. A ball nut extends around the screw portion of the steering member and has an internal thread. A plurality of balls are disposed between the internal thread on the ball nut and the external thread on the steering member for transmitting force between the ball nut and the screw portion of the steering member. An electric motor includes a rotor drivingly connected to the ball nut and a stator, the stator when energized effecting rotation of the rotor and, thereby, rotation of the ball nut. The steering assembly further includes a one-piece molded plastic member having a first axial portion disposed adjacent to the pinion, a second axial portion encapsulating and supporting the stator core and the stator windings, and a third axial portion supporting the ball nut for rotation with the rotor relative to the housing.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF A PREFERRED EMBODIMENT

Figure 1:
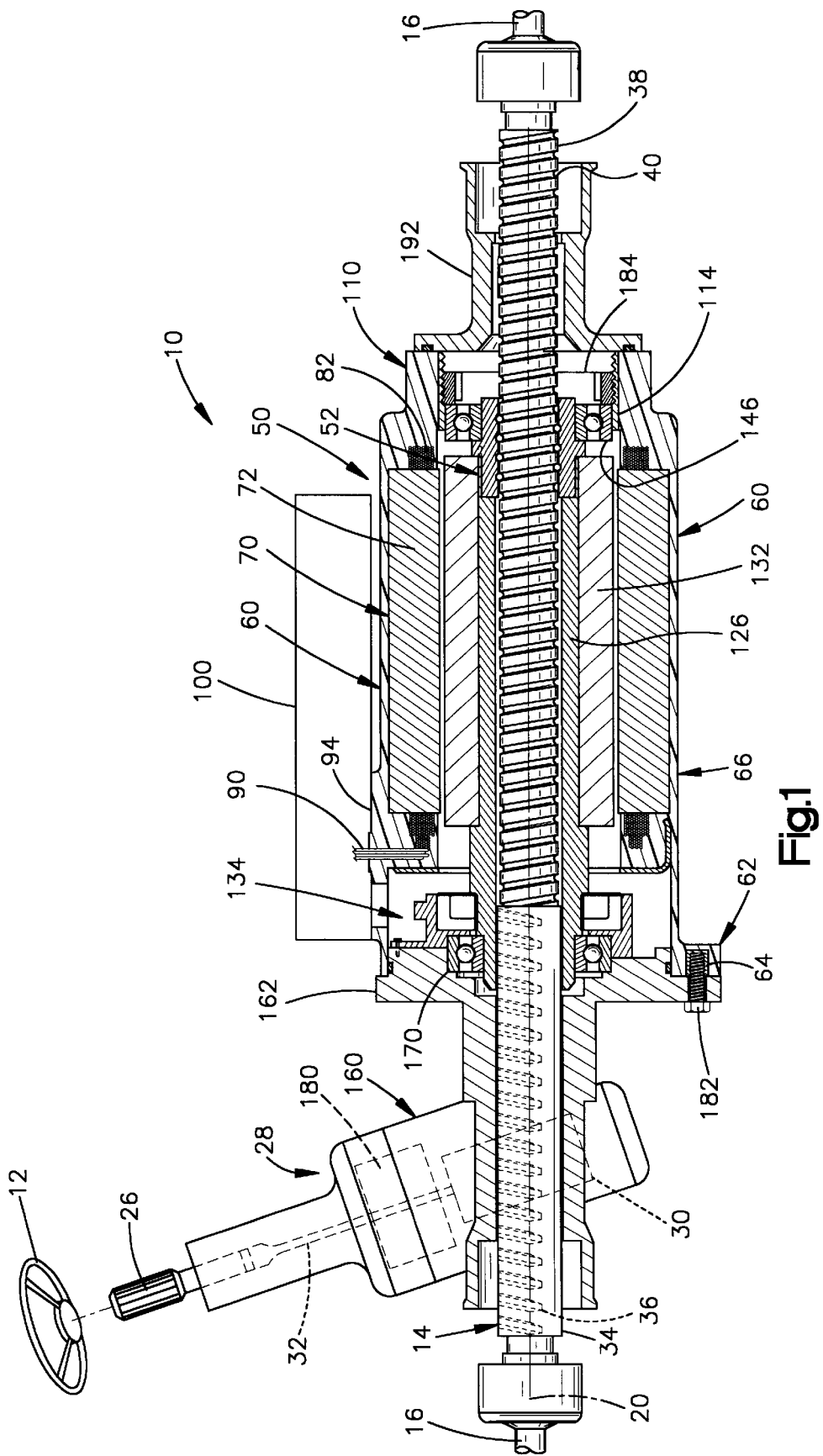
FIG. 1 is a view, partially in section, of a steering system in accordance with the present invention.

The present invention relates to a power assist steering system. In particular, the present invention relates to an electric power assist steering system which includes an electric assist motor for applying force to a steering member, such as a rack. As representative of the present invention, FIG. 1 illustrates a power assist steering system 10.

The steering system 10 includes a driver-operated steering wheel 12 operatively connected to a steering member 14. The steering member 14 is coupled with the steerable wheels (not shown) of a vehicle through tie rods 16. The steering member 14 extends along an axis 20 of the steering system 10.

The vehicle steering wheel 12 is connected for rotation with an input shaft 26 which extends into a pinion housing 28. The input shaft 26 is mechanically coupled by a torsion bar 32, in a known manner, to a pinion gear 30 located in the pinion housing 28.

The steering member 14 includes a first portion 34 having rack teeth 36 disposed thereon and a second portion 38 having an external screw thread convolution 40 axially spaced from the rack teeth. The rack teeth 36 on the steering member 14 are in meshing engagement with gear teeth (not shown) on the pinion gear 30.

The steering system 10 includes an electric assist motor 50, described below in detail, drivably connected to a ball nut assembly 52 for effecting axial movement of the steering member 14 upon rotation of the vehicle steering wheel 12. In the event of inability of the motor 50 to effect axial movement of the steering member 14, the mechanical connection between the gear teeth 42 on the pinion gear 30 and the rack teeth 36 on the steering member 14 can effect manual steering of the vehicle. The motor 50 includes a motor tube 60 which houses the other components of the motor. The motor tube 60 and the pinion housing 28, together, form a housing of the steering assembly 10.

The motor tube 60 is a plastic member which is injection molded as one piece. A preferred material for the motor tube 60 is PPS (polyphenylene sulfide) incorporating long glass fibers for strength.

The motor tube 60 has a first axial portion 62 which is disposed adjacent to the pinion housing 28 and the pinion 30. A plurality of metal mounting bolt sockets 64, one of which is shown in FIG. 1, are insert molded into the first axial portion 62 of the motor tube 60.

A second axial portion 66 of the motor tube 60 encases a stator 70 of the motor 50. The second axial portion 66 of the motor tube 60 has a generally cylindrical configuration centered on the axis 20.

The stator 70 includes a metal core 72 (FIGS. 2–5) formed of a plurality of stacked laminations which are laser welded together to form the core. The core 72 as thus formed has a plurality of axially extending ribs 74 (FIG. 5). The ribs 74 have cylindrical inner surfaces 76 which partially define a generally cylindrical inner surface 78 of the stator 70. The ribs 74 define a series of slots 80 in the stator 70. The stator 70 also includes a series of stator windings 82 disposed in the slots 80 in the core 72. The windings 82 form magnetic poles of the motor 50.

To form the motor tube 60, the stator 70, including the stator core 72 and the stator windings 82, is placed in a suitable mold (not shown) and liquid plastic material is injected into the mold and cured. The plastic material flows around and encases the stator core 72 and the stator windings 82.

A portion of the plastic material extends around the outer periphery of the stator core 72 to form an axially extending side wall 84 of the motor tube 60. The material of the side wall 84 fits intimately around the radially outer edges of the stacked laminations of the stator core 72.

Another portion of the material of the second axial portion 66 of the motor tube 60 flows radially inward of the stator windings 82. This plastic material forms thin layers 86 over the individual stator windings 82 in the slots. The thin layers 86 of plastic material have cylindrical inner surfaces 88 which partially define the inner surface 78 of the stator 70. The inner surface 78 of the stator 70 defines a rotor space 89 of the motor 50. A portion of the mold (not shown) prevents the plastic material from flowing onto the inner surfaces 76 of the ribs 74.

The stator windings 82 have leads 90 (FIGS. 2–4) for connection with motor actuation circuitry of the vehicle. Inner portions 92 of the leads 90 are permanently positioned and retained in the plastic material of the second axial portion 66 of the motor tube 60. End portions 94 of the leads 90 extend out of the second axial portion 66 of the motor tube 60 for connection with the vehicle electric circuitry.

Figure 2:
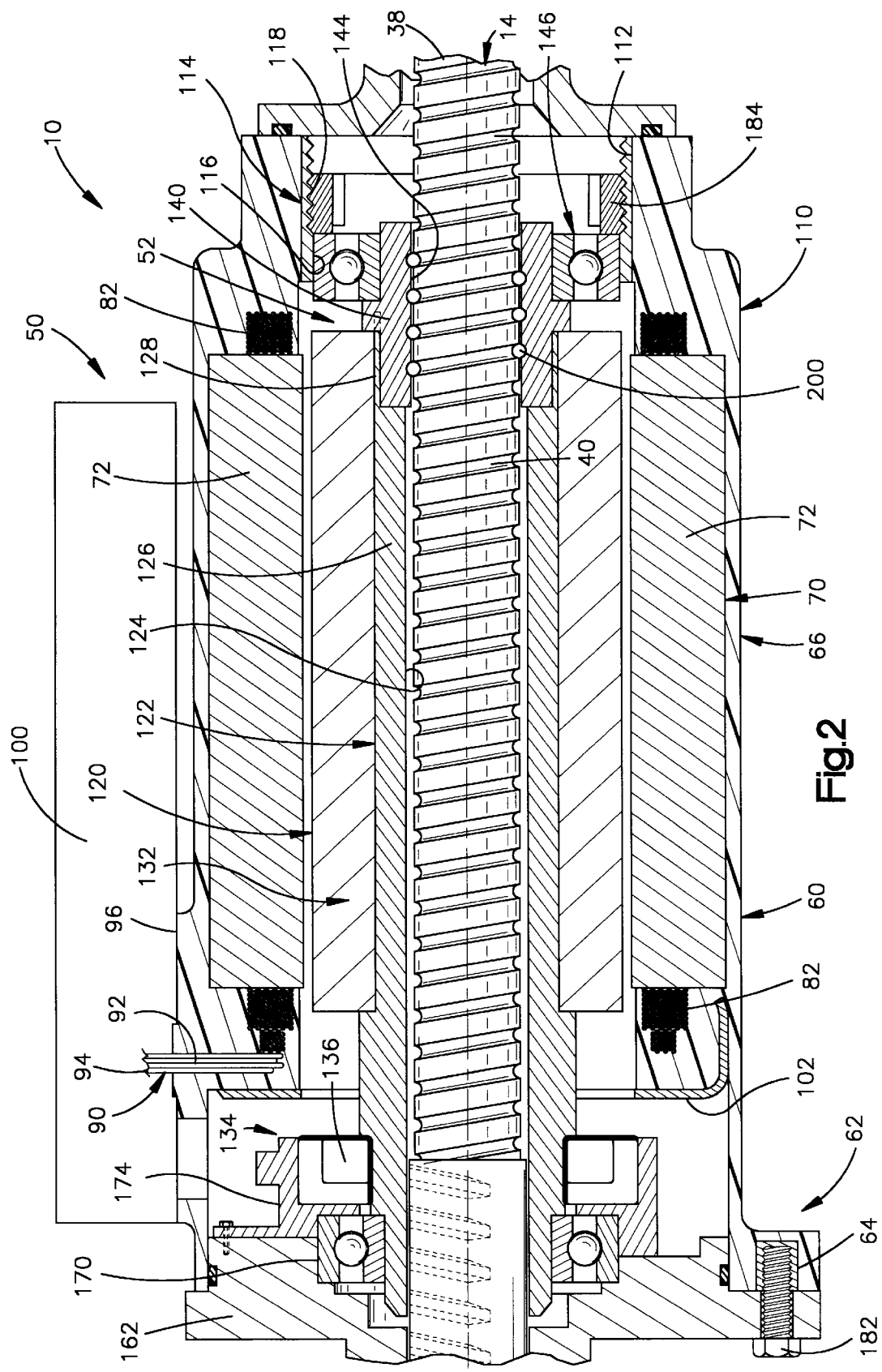
FIG. 2 is an enlarged view of a portion of the steering system of FIG. 1.
Figure 3:
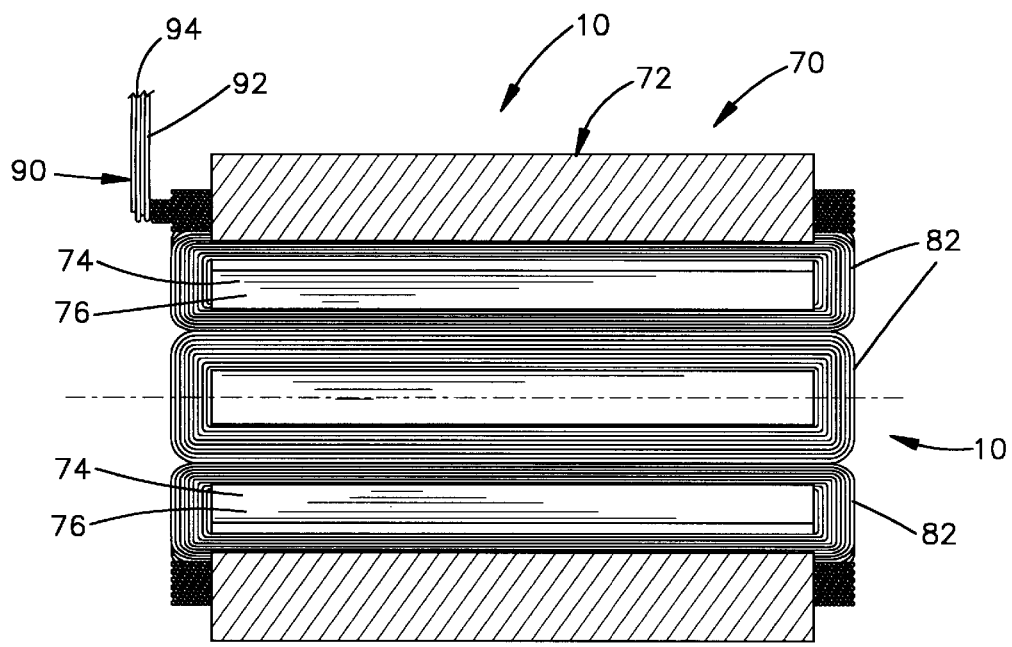
FIG. 3 is a sectional view of a motor stator which forms part of the steering system of FIG. 1.
Figure 4:
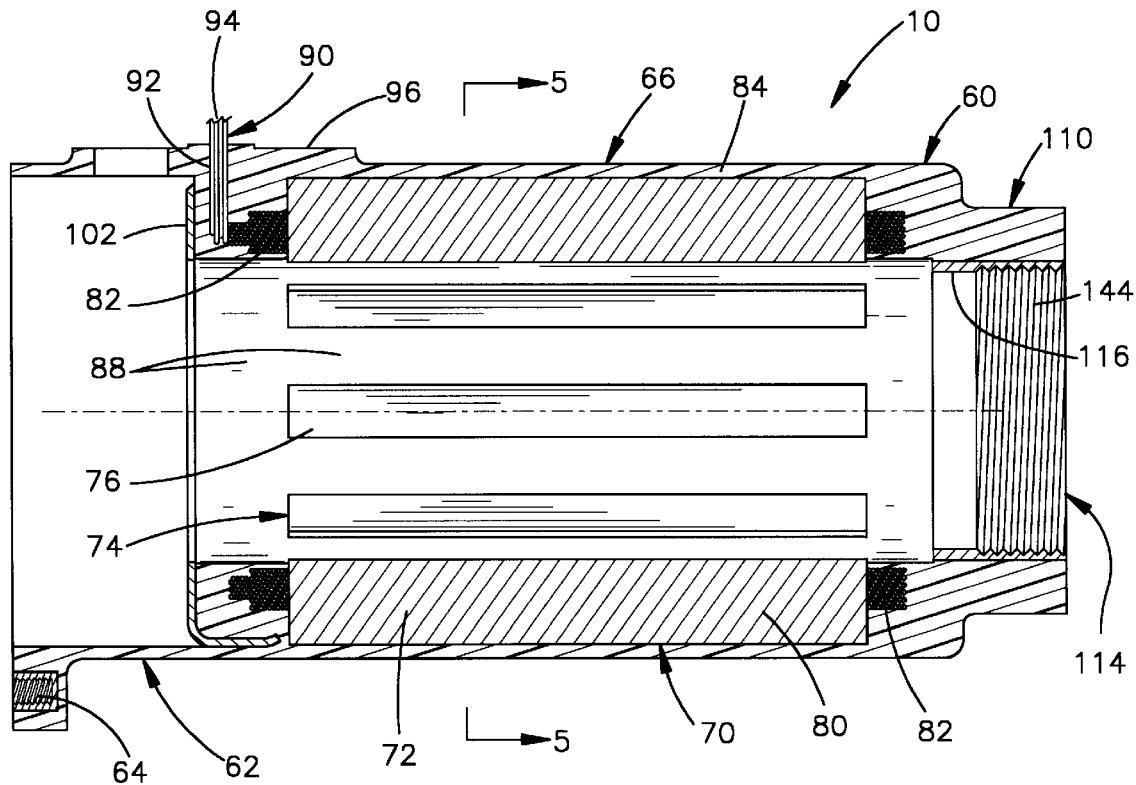
FIG. 4 is a view similar to FIG. 3 of the motor stator molded with a motor tube.
Figure 5:
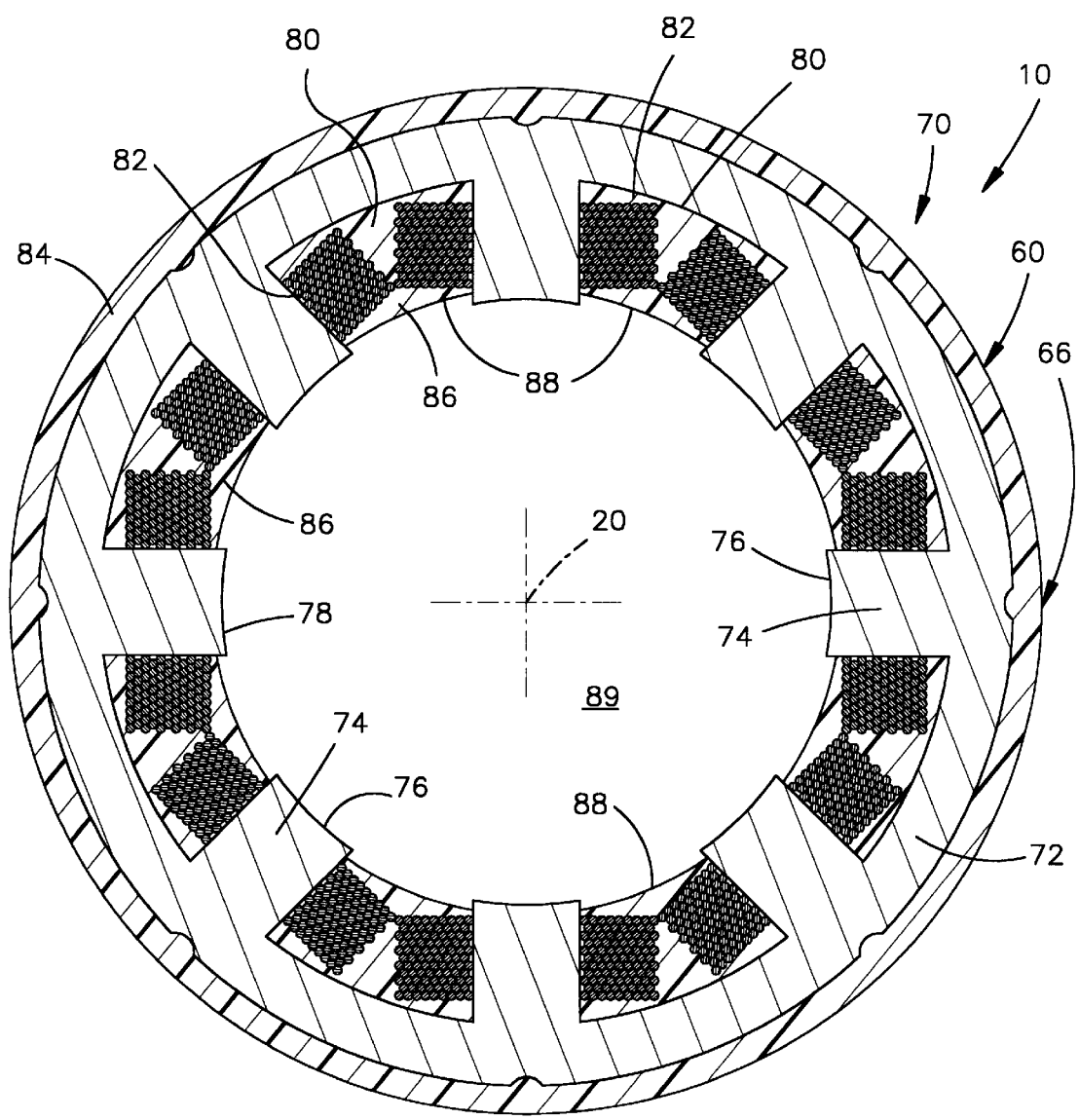
FIG. 5 is a sectional view of the stator and motor tube of FIG. 4, taken along line 5—5 of FIG. 4.

An exterior part of the second axial portion 66 of the motor tube 60 is formed as a platform 96 (FIGS. 2 and 4). The end portions 94 of the stator leads 90 project from the platform 96. The platform 96 is adapted to receive an electronic control module 100 of the steering assembly 10.

An annular metal shield 102 is also molded into the second axial portion 66 of the motor tube 60, adjacent to the first axial portion 62 of the motor tube. The shield 102 helps to block the flow of electric flux from the stator 70. The shield 102 also defines the left end (as viewed in FIGS. 1–2) of the portion of plastic material which encases the stator 70.

A third axial portion 110 of the motor tube 60 comprises a radially thickened portion of the motor tube which is disposed at the right end (as viewed in FIG. 1) of the motor tube. A metal insert 114 is insert molded with the third axial portion 110 of the motor tube 60. The metal insert 114 has a cylindrical bearing surface 116 centered on the axis 20. An internal spanner nut thread 118 is formed on the metal insert 114 at a location axially outward of the bearing surface 116.

A rotor assembly 120 is disposed radially inward of the stator 70. The rotor assembly 120 includes a tubular, cylindrical rotor shaft 122 having a cylindrical central passage or opening 124. The rotor shaft 122 has a main body portion 126 and a thin-walled right end portion 128. A rotor 132 is press fit on the outside of the rotor shaft 122. The motor 50 also includes a motor position sensor indicated schematically at 130 (FIG. 1). The motor position sensor 134 includes a position sensor rotor 136 press fit on the left end (as viewed in FIG. 1) of the rotor shaft 122.

The ball nut assembly 52 (FIGS. 1–3) includes a ball nut 140 which is press fit inside the right end portion 128 of the rotor shaft 122. The ball nut 140 has an internal screw thread convolution 144. A first bearing 146 is press fit onto the ball nut 140.

During the process of assembling the motor 50, the rotor shaft 122 and the other parts which are rotatable with it, including the rotor 132, the ball nut 140, the first bearing 146, and the motor position sensor rotor 136, are slipped into the molded assembly of the motor tube 60 and the stator 70. The outer race of the first bearing 146 engages the cylindrical bearing surface 116 on the metal insert 114 in a radial force-transmitting relationship. The motor tube 60 and the first bearing 146 thus support the right hand end of the rotor assembly 120 for rotation relative to the stator 70. At this point in the manufacture of the steering assembly 10, the first bearing 146 is not supported axially in the motor tube 60.

The opposite end (the left end as viewed in FIG. 1) of the rotor assembly 120 is supported by the pinion housing 28 as follows. The pinion housing 28 includes a cast metal main body portion 160 which receives the pinion gear 30 and through which the rack portion 34 of the steering member 14 extends. The main body portion 160 of the pinion housing 28 has an extension portion 162 for connection with the motor tube 60.

A second bearing 170 is pressed into the extension portion 162 of the pinion housing 28. The second bearing 170 is supported both radially and axially in the main body portion 160 of the pinion housing 28.

A motor position sensor stator 174 is secured to the pinion housing 28 outward of the second bearing 170. The motor position sensor stator 174 cooperates with the motor position sensor rotor 102, in a known manner, to help control operation of the motor 50.

The assembly of the pinion housing 28 and its attached parts is fastened to the motor assembly including the stator 70, the rotor 132, and the ball nut 142. The pinion housing 28 is fastened directly to the motor tube 60. A circular array of mounting bolts, one of which is illustrated at 182, secures the pinion housing 28 to the motor tube 60. The mounting bolts 182 are screwed into the mounting bolt inserts 64 in the motor tube.

A spanner nut 184 is then screwed into the spanner nut thread 118 on the metal insert 114 at the open end of the motor tube 60 (the right end as viewed in FIG. 1). The spanner nut 184 is tightened down axially against the outer race of the first bearing 146. The engagement between the spanner nut 184 and the outer race of the first bearing 146 places an axial load on the first bearing. The axial load on the first bearing 146 is transmitted through the inner race of the first bearing to the ball nut 140. The first bearing 146 biases the ball nut 140 axially in a direction toward the second bearing 170.

The axial load on the ball nut 140 is transmitted into the rotor shaft 122. The axial load on the rotor shaft 122 is transmitted into the second bearing 170. The axial load on the second bearing 170 is transmitted to the extension portion 162 of the pinion housing 28. The second bearing 170 supports the left end of the rotor assembly 120 for rotation relative to the stator 70. The rotor assembly 120, at this point in the manufacture of the steering assembly 10, can now be turned relative to the stator 70.

A torque sensor 180 indicated schematically is located in the pinion housing 28. The torque sensor 180 is operative to sense relative movement between the input shaft 26 and the pinion gear 30, to help control operation of the motor 50, in a known manner.

The ECU (electronic control unit) 100 is fastened to the platform 96 on the second axial portion 66 of the motor tube 60. The end portions 94 of the stator leads 90 are electrically connected with the ECU 100. The torque sensor 180 and the motor position sensor 134 also are electrically connected to the ECU 100. An outboard housing 192 closes the right end (as viewed in FIG. 1) of the motor 50.

The steering member 14 is inserted into the central opening 124 of the rotor shaft 126 of the motor 50. The ball nut assembly 52 extends around the screw portion 38 of the steering member 14. The ball nut assembly 52 includes a plurality of force-transmitting members in the form of balls 200 disposed between the internal thread 144 on the ball nut 140 and the external thread 40 on the screw portion 38 of the steering member 14. The balls 200 are loaded into the ball nut assembly 52 in a known manner. The ball nut 140 includes a recirculation passage (not shown) for recirculating the balls 200 upon axial movement of the steering member 14 relative to the ball nut.

Upon rotation of the vehicle steering wheel 12 by the driver of the vehicle, the vehicle electric circuitry, including the ECU 100 and the torque sensor 180, determines whether the motor 50 should be operated to provide steering assist to move the steering member 14. If the motor 50 is operated, the rotor 132 is caused to rotate about the axis 20 relative to the stator 70. The rotor shaft 122 and the ball nut 140 rotate with the rotor 132. The balls 200 transmit the rotational force of the ball nut 140 to the screw portion 38 of the steering member 14. Because the ball nut 140 is fixed in position axially, the steering member 14 is driven to move axially in response, effecting steering movement of the steerable wheels of the vehicle as desired.

The plastic motor tube 60 weighs substantially less than a metal motor tube having the same size and structural strength. For example, in one prior art motor, the metal motor tube weighs about five pounds, while a plastic motor tube constructed in accordance with the present invention for the same motor would weigh about one and one-half pounds. This significantly reduces the overall weight of the steering system 10.

The plastic material of the motor tube 60 also reduces noise from the inherent relative movement of the stator core laminations during operation of the motor 50. The plastic motor tube 60 may also result in higher motor output because of decreased flux loss in the stator 70.

The material of the side wall 84 of the plastic motor tube 60 fits intimately around the stacked laminations of the stator core 72. A metal motor tube for this application must have a tolerance of about plus or minus 0.001 inches, in order to achieve a secure press fit on the stator core. This is difficult to achieve with a metal motor tube, because the stack of laminations does not have a smooth outer surface but instead has a tolerance of about three to four thousandths of an inch. Also, the stack of laminations of the stator core 72 is about seven inches long, which makes machining a cylindrical inner surface, as part of a blind bore, difficult and expensive.

From the above description of the invention, those skilled in the art will perceive improvements, changes and modifications in the invention. Such improvements, changes and modifications within the skill of the art are intended to be covered by the appended claims.

Having described the invention, we claim:

1. A steering assembly for turning steerable wheels of a vehicle in response to rotation of a steering wheel of the vehicle, said steering assembly comprising:

a pinion;

a steering member which is movable axially to effect turning movement of the steerable wheels of the vehicle, said steering member having a rack portion for engagement with said pinion and an externally threaded screw portion;

a ball nut extending around said screw portion of said steering member and having an internal thread;

a plurality of balls disposed between said internal thread on said ball nut and said external thread on said steering member for transmitting force between said ball nut and said screw portion of said steering member;

an electric motor comprising a rotor drivingly connected to said ball nut and a stator, said stator when energized effecting rotation of said rotor and, thereby, rotation of said ball nut; and a one-piece molded plastic member having a first axial portion disposed adjacent to said pinion, a second axial portion encapsulating and supporting said stator core and said stator windings, and a third axial portion supporting said ball nut for rotation with said rotor relative to said housing.

2. A steering assembly as set forth in claim 1 further comprising a metal insert molded into said third axial portion of said plastic member, said metal insert having a cylindrical bearing surface supporting a bearing assembly disposed intermediate said ball nut and said third axial portion of said plastic member.

3. A steering assembly as set forth in claim 2 wherein said metal insert has an internal thread disposed axially outward of said bearing surface, said steering assembly further comprising a spanner nut screwed into said internal thread on said metal insert, said spanner nut engaging said bearing assembly and blocking axial movement of said bearing assembly.

4. A steering assembly as set forth in claim 1 wherein said stator has wire leads for electrically connecting said stator to electric circuitry of the vehicle, said wire leads having first portions encased in said second axial portion of said plastic member and having end portions projecting from said second axial portion of said plastic member for connection with the vehicle electric circuitry.

5. A steering assembly as set forth in claim 4 wherein said second axial portion of said plastic member has an exterior portion forming a platform, said vehicle electric circuitry comprising an electronic control module for said motor supported by said platform, said end portions of said stator leads being electrically connected adjacent to said platform with said electronic control module.

6. A steering assembly as set forth in claim 1 comprising a plurality of metal mounting bolt sockets molded into said first axial portion of said plastic member, said steering assembly further comprising a housing for said pinion and a plurality of mounting bolts screwed into said mounting bolt sockets and connecting said plastic member with said pinion housing.

7. A steering assembly as set forth in claim 1 wherein said stator comprises a core and a series of windings on said core, said stator having a cylindrical rotor space at least partially defined by said stator core, said rotor being disposed in said rotor space, said rotor having an axially extending central passage, said steering member extending through said central passage in said rotor.

8. A steering assembly as set forth in claim 7 wherein said core has ribs defining slots in said core, said windings being disposed in said slots in said core, said second axial portion of said plastic member having portions which cover said windings in said slots and which have radially inner surfaces at least partially defining said rotor space.

9. A steering assembly as set forth in claim 7 wherein said second axial portion of said plastic member has a cylindrical outer surface which forms a cylindrical outer surface of said motor.

* * * * *